(12) United States Patent
Yoshihara et al.

(10) Patent No.: US 10,648,398 B2
(45) Date of Patent: May 12, 2020

(54) INTAKE STRUCTURE OF INTERNAL COMBUSTION ENGINE

(71) Applicant: MITSUBISHI JIDOSHA KOGYO KABUSHIKI KAISHA, Tokyo (JP)

(72) Inventors: Akira Yoshihara, Tokyo (JP); Koichi Matsumoto, Tokyo (JP); Shigeki Nabetani, Tokyo (JP); Kazuaki Koyama, Tokyo (JP); Yuya Okamoto, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/224,420

(22) Filed: Dec. 18, 2018

(65) Prior Publication Data

US 2019/0186343 A1    Jun. 20, 2019

(30) Foreign Application Priority Data

Dec. 19, 2017   (JP) ................................ 2017-242410

(51) Int. Cl.
*F02B 31/00*   (2006.01)
*F02B 23/10*   (2006.01)
(Continued)

(52) U.S. Cl.
CPC .............. *F02B 23/10* (2013.01); *F02B 31/04* (2013.01); *F02F 1/425* (2013.01); *F02F 1/4214* (2013.01);
(Continued)

(58) Field of Classification Search
CPC .. F02B 1/04; F02B 29/06; F02B 31/04; F02B 2023/108; F02B 2031/003; F02M 35/10059
(Continued)

(56) References Cited

U.S. PATENT DOCUMENTS 6,604,424 B1 *   8/2003   Kawabe .............. G01L 19/0007
                                                      73/716
7,150,267 B2 *  12/2006   Kuriki ................... F02F 1/4235
                                                      123/432
(Continued)

FOREIGN PATENT DOCUMENTS

DE    10 2016 003 555 A1    9/2016
EP       2 787 208 A1    10/2014
(Continued)

OTHER PUBLICATIONS

European Extended Search Report issued in European Application No. 18211449.6, dated Apr. 16, 2019.

*Primary Examiner* — John Kwon
(74) *Attorney, Agent, or Firm* — Birch Stewart Kolasch & Birch LLP.

(57) ABSTRACT

In an intake structure of an internal combustion engine, on an intake upstream side from a valve seat of an intake port, a convex portion is provided which protrudes to an inside of the intake port in a place near an outer circumferential portion of a cylinder chamber when viewed from an upper side of the cylinder chamber. The convex portion includes an upstream guide surface extending from an apex of the convex portion to the intake upstream side, and a downstream guide surface extending from the apex to an intake downstream side and including a curved surface recessed inside the convex portion at a middle portion thereof.

6 Claims, 4 Drawing Sheets

(51) Int. Cl.
*F02F 1/42* (2006.01)
*F02M 35/10* (2006.01)
*F02B 31/04* (2006.01)

(52) U.S. Cl.
CPC ..... *F02F 1/4235* (2013.01); *F02M 35/10118* (2013.01); *F02B 2023/106* (2013.01)

(58) Field of Classification Search
USPC .................. 123/294, 298, 301, 305, 306
See application file for complete search history.

(56) References Cited

U.S. PATENT DOCUMENTS

| | | | | |
|---|---|---|---|---|
| 8,430,074 B2* | 4/2013 | McCarthy | ............. | F02B 31/085 123/188.14 |
| 8,770,168 B2* | 7/2014 | Cornwell | ............ | F02B 23/0669 123/193.6 |
| 2016/0281633 A1 | 9/2016 | Nakahara et al. | | |

FOREIGN PATENT DOCUMENTS

| | | |
|---|---|---|
| FR | 2.037.270 A1 | 12/1970 |
| FR | 2 910 541 A1 | 6/2008 |
| FR | 2 923 268 A1 | 5/2009 |
| JP | 7-25235 U | 5/1995 |
| JP | 2004-316609 A | 11/2004 |

\* cited by examiner

INTAKE STRUCTURE OF INTERNAL COMBUSTION ENGINE

CROSS REFERENCE TO RELATED APPLICATION

This application is based on Japanese Patent Application No. 2017-242410 filed on Dec. 19, 2017, the contents of which are incorporated herein by reference.

BACKGROUND OF THE INVENTION

The present invention relates to an intake structure of an internal combustion engine.

There is known a technique in which a tumble flow swirling along an axis direction of a cylinder chamber is formed by intake air in order to perform combustion of an internal combustion engine efficiently.

In that case, an intake port is provided to be inclined to one side of a cylinder chamber with respect to the center line of the cylinder chamber, so as to form the tumble flow.

In order to improve the efficiency of the combustion of the internal combustion engine, it is important to obtain a strong tumble flow stably.

In JP-U-H7-25235, it is proposed that a protrusion part which generates a deflection flow for generating a tumble flow is provided in the intake port, and the protrusion part is formed of an elastic bellows.

According to JP-U-H7-25235, the strength of the deflection flow is adjusted by adjusting the swelling amount of the protrusion part, so that the strength of the tumble flow is adjusted according to the load of the internal combustion engine.

In JP-A-2004-316609, it is proposed that a stepped part which projects to the inside of the intake port is provided in a boundary between a wall surface positioned on the far side from the one side of wall surfaces of the intake port and a throat part of a valve seat continuous to the intake port.

According to JP-A-2004-316609, the flow of the intake air guided along the wall surface positioned on the far side from the one side of the wall surfaces of the intake port, that is, the intake air in a direction opposite to the tumble flow is disturbed by the stepped part. The flow rate of the intake air guided in the cylinder chamber on the side opposite to the one side, that is, the intake air in the direction opposite to the tumble flow is controlled to obtain a strong tumble flow.

However, in the related art, it is not considered how to prevent the partial backflow of the tumble flow formed in the cylinder chamber to the intake port.

Particularly, when the internal combustion engine is operated with a high expansion ratio, in a case where the intake valve is closed late at the timing when a piston rises from a bottom dead center to a top dead center, the fuel-air mixture in the cylinder chamber more easily flows back to the intake port as the tumble flow is stronger. For this reason, there is a concern that a charging efficiency is deteriorated. In addition, generally, a cylinder head forms the valve seat or the like in a casting by machining. However, for example, in a case where the stepped part is formed by using the machine processing, there is a concern that the position of the stepped part is varied according to a processing accuracy, and the variation occurs to the height of the stepped part when a deviation of a mold at the time of casting is repeated.

The invention has been made in consideration of the above situation, and an object thereof is to provide an intake structure of an internal combustion engine which is advantageous for strengthening a tumble flow in a cylinder chamber and preventing a backflow of a fuel-air mixture to an intake port.

SUMMARY

According to an aspect of the invention, in an intake structure of an internal combustion engine, on an intake upstream side from a valve seat of an intake port, a convex portion is provided which protrudes to an inside of the intake port in a place near an outer circumferential portion of a cylinder chamber when viewed from an upper side of the cylinder chamber. The convex portion includes an upstream guide surface extending from an apex of the convex portion to the intake upstream side, and a downstream guide surface extending from the apex to an intake downstream side and including a curved surface recessed inside the convex portion at a middle portion thereof.

According to the invention, the downstream guide surface guides the fuel-air mixture, which is guided by the tumble flow from the cylinder chamber to the outer circumferential wall part about to return to the intake port, from the outer circumferential wall part to the central wall part. The fuel-air mixture, which is about to return from the cylinder chamber to the upstream side of the intake port by the tumble flow, is blocked by the flow of the guided fuel-air mixture.

Therefore, it is advantageous for preventing that the fuel-air mixture in the cylinder chamber flows back to the intake port, and it is advantageous for improving the charging efficiency.

DETAILED DESCRIPTION OF THE EMBODIMENTS

First Embodiment

Hereinafter, the embodiments of the invention will be described with reference to the drawings.

Figure 1:
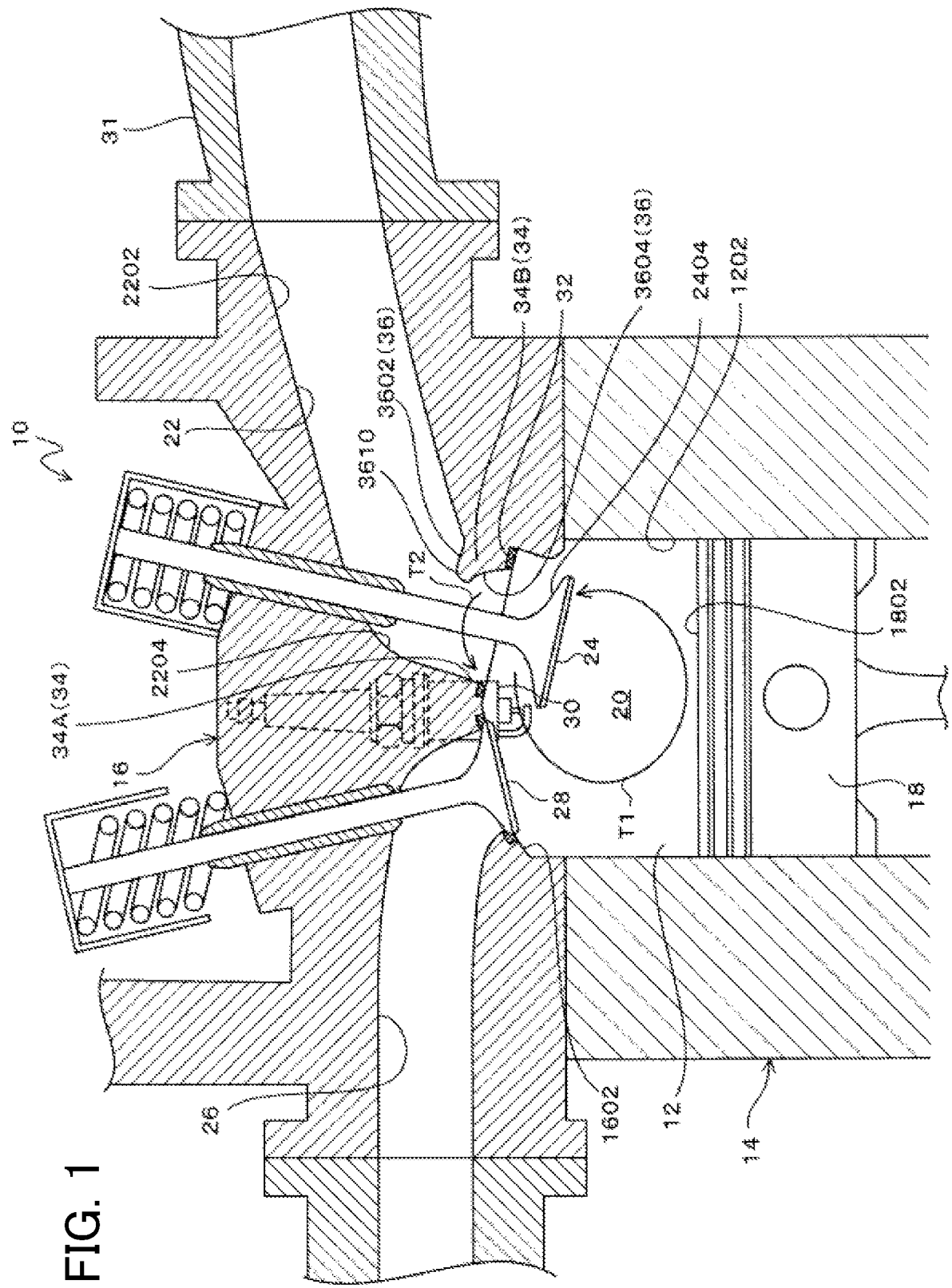
FIG. 1 is a sectional view illustrating a structure of an intake structure of an internal combustion engine according to a first embodiment.

As illustrated in FIG. 1, an internal combustion engine (engine) 10 includes a cylinder block 14 in which a plurality of cylinder chambers 12 are formed, a cylinder head 16 which is provided on the upper side of the cylinder block 14, and a piston 18 which is arranged in the cylinder chamber 12.

A combustion chamber 20 is configured by an inner circumferential surface 1202 of the cylinder chamber 12, a lower surface 1602 of the cylinder head 16, and a top surface 1802 of the piston 18.

The cylinder head 16 is provided with two intake ports 22, intake valves 24 which open and close the respective intake ports 22, two exhaust ports 26, exhaust valves 28 which open and close the respective exhaust ports 26, and an ignition plug 30.

The ignition plug 30 is provided in the lower surface 1602 of the cylinder head 16 to be positioned at the almost center of the combustion chamber 20.

Each of the intake ports 22 includes an upstream portion 2202 which communicates with an intake manifold 31 to extend on the upper side of the cylinder chamber 12 in the radial direction of the cylinder chamber 12, and a downstream portion 2204 which is connected to the upstream portion 2202 and is curved to the cylinder chamber 12 side.

An intake valve seat 32 is mounted in the downstream end of the downstream portion 2204, and the intake port 22 is closed and opened by contacting and separating the intake valve 24 on and from the intake valve seat 32.

Figure 2:
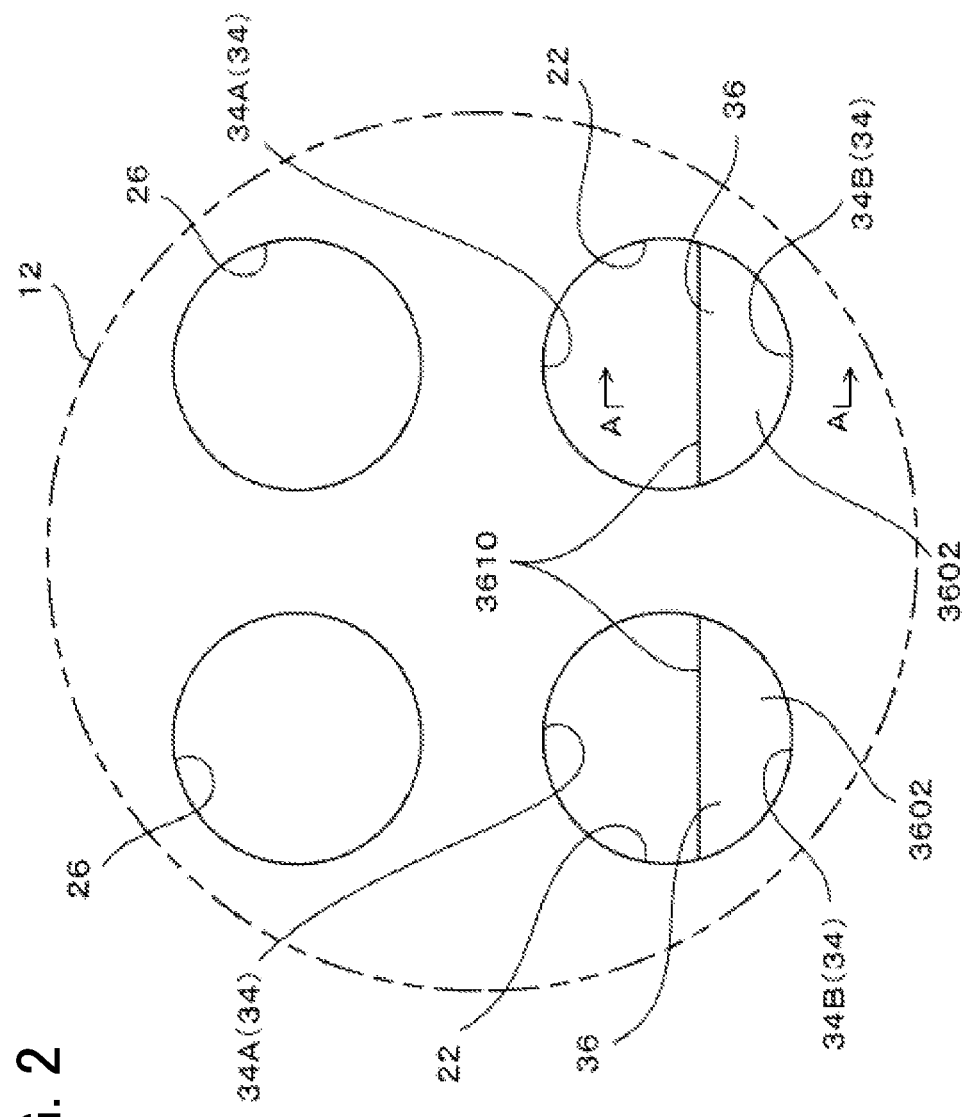
FIG. 2 is a view illustrating a cylinder chamber, an intake port, and an exhaust port when viewed from an upstream side of the intake port.

As illustrated in FIGS. 1 and 2, a portion 34, which is adjacent to the upstream side with respect to the intake valve seat 32, of the downstream portion 2204 includes a central wall part 34A which extends on the central portion side of the cylinder chamber 12 in a semi-arc shape and an outer circumferential wall part 34B which extends on the outer circumferential side of the cylinder chamber 12 in a semi-arc shape.

Figure 3:
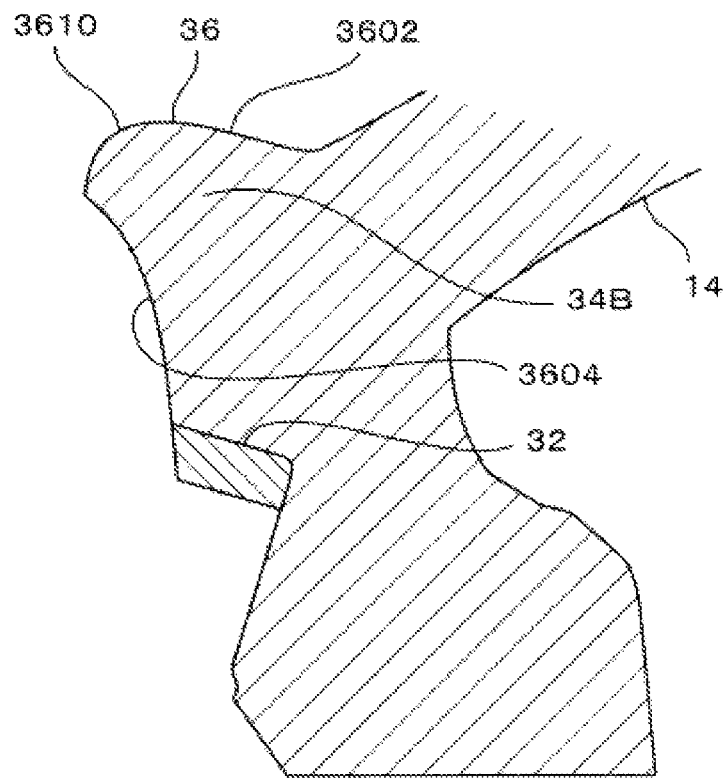
FIG. 3 is a sectional view illustrating a cutaway of a convex portion along a sectional surface of line A-A of FIG. 2.

As illustrated in FIGS. 1 and 3, in the outer circumferential wall part 34B of each of the intake ports 22, a convex portion 36 for generating a tumble flow T1 is respectively formed to protrude to the inside of the intake port 22. A reference numeral 3610 denotes the apex of the convex portion 36.

As illustrated in FIGS. 1 to 4, the each convex portion 36 includes an upstream guide surface 3602 and a downstream guide surface 3604 respectively.

The upstream guide surface 3602 extends from the apex 3610 to an intake upstream side.

The downstream guide surface 3604 extends from the apex 3610 to the intake downstream side to form a curved surface recessed inside the convex portion 36 at a middle portion.

Figure 4:
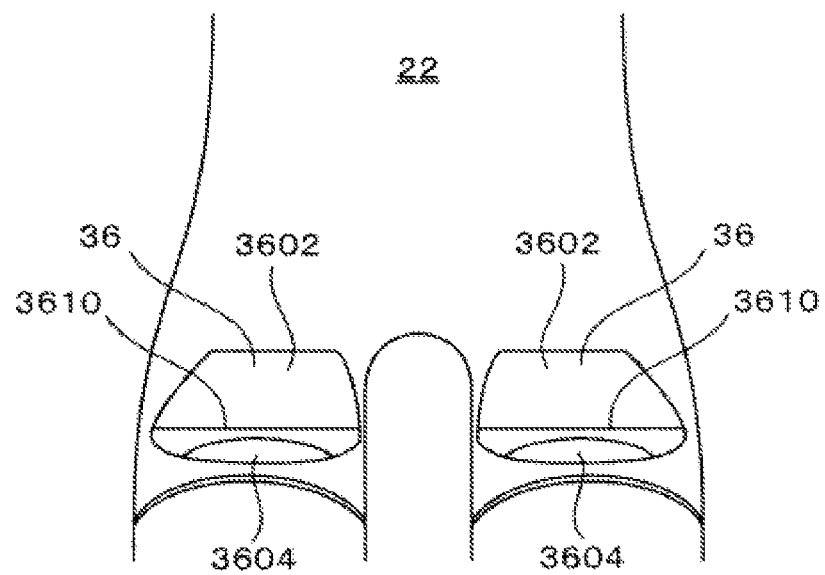
FIG. 4 is a view for describing the convex portion formed in the intake port when viewed from an inside of the cylinder chamber.

As illustrated in FIGS. 2 and 4, the apex 3610 linearly extends in a direction orthogonal to the flow direction of the intake air of the intake port 22 when viewed from the upstream side of the intake air inside the intake port 22.

The upstream guide surface 3602 is formed slantingly such that the intake air which flows in the cylinder chamber 12 from the intake port 22 forms the tumble flow T1.

In other words, the upstream guide surface 3602 is formed such that the intake air which flows through the intake port 22 is directed to the center of the cylinder chamber 12.

The upstream guide surface 3602 is continuously connected with the wall surface of the intake port 22 to form an obtuse angle.

At the time of the intake stroke of the intake valve 24, the downstream guide surface 3604 guides the fuel-air mixture, which is guided by the tumble flow T1 from the cylinder chamber 12 to the outer circumferential wall part 34B about to return to the intake port 22, to the central wall part 34A, thereby preventing that the fuel-air mixture returns to the upstream side of the intake port 22.

When the description is given in more detail, the tip of the downstream guide surface 3604 is directed toward the portion of the central wall part 34A which extends on the central portion side of the cylinder chamber 12 in a semi-arc shape.

In addition, the apex 3610 is formed in a streamline in which the upstream guide surface 3602 and the downstream guide surface 3604 are connected in a curved line.

Incidentally, at the time of casting the cylinder head 16, the convex portion 36 is formed by a mold, the apex 3610 and the upstream guide surface 3602 are formed in a core (mold), and the downstream guide surface 3604 is formed by cutting processing.

Therefore, the convex portion 36 can be produced simply, which is advantageous for improving the productivity.

Incidentally, it is also considered that the apex 3610 of the convex portion 36 is formed by the cutting processing. However, in that case, the position of the apex 3610 may be deviated according to the accuracy of the cutting processing. In addition, since the cutting processing is performed by a drill or the like, it is considered that the apex 3610 cannot be formed linearly, and the timing when the intake air is directed to the center of the cylinder chamber 12 is deviated in the radial direction, so as to affect the formation of the tumble flow T1. Further, since the end surface of the cutting processing is edged, it is also considered that a turbulence is generated by the edge, and the formation of the tumble flow T1 is also affected by the turbulence.

Thus, when the convex portion 36 is formed in the mold of the casting, the apex 3610 can be formed in a streamline which is connected in the curved line. Further, the edge made by the cutting processing is on the downstream side of the apex 3610, and thus the effect of the edge to the formation of the tumble flow can be reduced.

The following operational effects are obtained according to this embodiment.

The downstream guide surface 3604 guides the fuel-air mixture, which is guided by the tumble flow T1 from the cylinder chamber 12 to the outer circumferential wall part 34B about to return to the intake port 22, from the outer circumferential wall part 34B to the central wall part 34A. Thus, the intake air, which is about to return from the cylinder chamber 12 to the upstream side of the intake port 22 by the tumble flow T1, is blocked by the flow T2 of the guided fuel-air mixture.

Therefore, it is advantageous for preventing that the fuel-air mixture in the cylinder chamber 12 flows back to the intake port 22, and it is advantageous for improving the charging efficiency.

In addition, the apex 3610 extends linearly in a direction orthogonal to the flow direction of the intake air of the intake port 22. Thus, the intake air is guided into the cylinder chamber 12 by the upstream guide surface 3602 of the convex portion 36 to form the tumble flow T1, and the intake air which is guided by the upstream guide surface 3602 of the convex portion 36 is not deflected in the extending direction of the apex 3610. Therefore, it is possible to strengthen the tumble flow T1, it is advantageous for guiding the intake air into the cylinder chamber 12 efficiently, and it is advantageous for improving the charging efficiency.

In addition, the upstream guide surface 3602 and the wall surface of the intake port 22 are continuously connected to form an obtuse angle. Thus, the resistance due to the upstream guide surface 3602 is controlled while the intake air is deflected by the upstream guide surface 3602 to strengthen the tumble flow T1. It is advantageous for guiding the intake air into the cylinder chamber 12 efficiently, and it is advantageous for improving the charging efficiency.

Incidentally, the downstream guide surface 3604 may be formed such that the fuel-air mixture, which is guided by the tumble flow T1 from the cylinder chamber 12 to the outer circumferential wall part 34B about to return to the intake port 22, is directed from the outer circumferential wall part 34B to a back surface 2404 of the intake valve 24 which faces the outer circumferential wall part 34B, so that a swirl flow is formed between the downstream guide surface 3604 and the back surface 2404 of the intake valve 24. In that case, the intake air, which is about to return from the cylinder chamber 12 to the upstream side of the intake port 22 by the tumble flow T1, is blocked by the swirl flow. Thus, it is advantageous for preventing that the fuel-air mixture in the cylinder chamber 12 flows back to the intake port 22, and it is advantageous for improving the charging efficiency.

Second Embodiment

Figure 5:
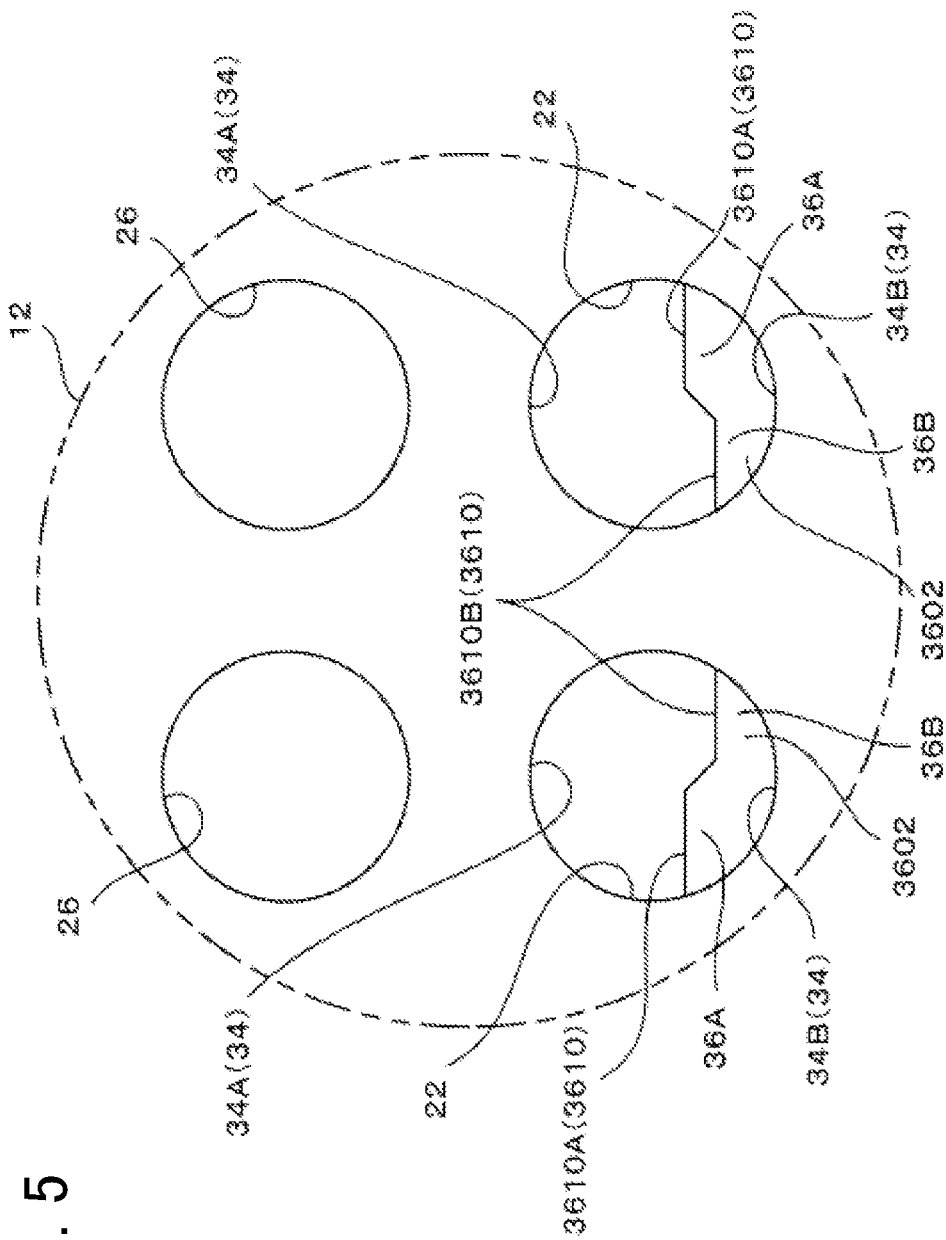
FIG. 5 is a view illustrating a cylinder chamber, an intake port, and an exhaust port in a second embodiment when viewed from the upstream side of the intake port.

Next, a second embodiment will be described with reference to FIG. 5.

Incidentally, in the following embodiment, the same portions and members as those of the first embodiment are denoted by the same reference numerals as those of the first embodiment, and the explanation thereof is not repeated.

The second embodiment is different from the first embodiment in that the convex portion 36 includes two apexes 3610A and 3610B which have different protruding heights, and the second embodiment is similar to the first embodiment in that the upstream guide surface 3602 and the downstream guide surface 3604 are formed in each of the convex portions 36.

When the description is given in more detail, when viewed from the upstream side of the intake port 22, the convex portion 36 includes a first portion 36A in which the apex 3610A extends linearly and a second portion 36B in which the apex 3610B with a smaller protruding amount than the apex 3610A extends linearly.

Each of the apexes 3610A and 3610B extends in a direction orthogonal to the flow direction of the intake air which flows through the intake port 22.

In this embodiment, two intake ports 22 are provided side by side with respect to one cylinder chamber 12. Thus, the first portions 36A are formed at places, which are apart from each other, of the convex portions 36. In other words, the apexes 3610A and 3610B of the convex portions 36A and 36B are formed such that the inside is lower than the outside, and the shape of the convex portions 36A and 36B is formed to be a linearly symmetrical shape having a center between the intake ports 22 when viewed from the upper side of the cylinder chamber 12.

In the second embodiment, the same effect as that of the first embodiment is obtained, and the second portions 36B which have smaller protruding amount than the first portion 36A are formed at places, which are near the center of the cylinder chamber 12, of the convex portions 36 in two intake ports 22. Thus, at the time of the intake stroke, it is more advantageous for strengthening the tumble flow T1 which is directed to the center (deep portion) of the cylinder chamber 12.

What is claimed is:

1. An intake structure of an internal combustion engine, wherein
on an intake upstream side from a valve seat of an intake port, a convex portion is provided which protrudes from a lower surface of the intake port in an upward direction to an inside of the intake port towards an upper surface of the intake port in a place near an outer circumferential portion of a cylinder chamber when viewed from an upper side of the cylinder chamber, and
the convex portion includes:
an upstream guide surface extending from an apex of the convex portion to the intake upstream side, an entire upstream guide surface having a curved concave shape, and
a downstream guide surface extending from the apex to an intake downstream side and including a curved surface recessed inside the convex portion at a middle portion thereof.

2. The intake structure of the internal combustion engine according to claim 1, wherein the apex extends in a direction orthogonal to a flow direction of an intake air which flows through the intake port.

3. The intake structure of the internal combustion engine according to claim 1, wherein two intake ports are provided side by side with respect to one cylinder chamber,
the convex portion is provided each of the two intake ports, and
an inside of the apex of each of the convex portions is formed to be lower than an outside of the apex.

4. The intake structure of the internal combustion engine according to claim 3, wherein a shape of the convex portion is formed to be linearly symmetrical to a virtual line drawn between the two intake ports when viewed from the upper side of the cylinder chamber.

5. The intake structure of the internal combustion engine according to claim 1, wherein the downstream guide surface extends from the apex to an intake valve seat defining the intake port.

6. The intake structure of the internal combustion engine according to claim 1, wherein the apex extends in a direction orthogonal to a flow direction of an intake air at the intake port when viewed from an upstream side of the intake air inside the intake port.

* * * * *